(12) United States Patent
Ubiñana Félix

(10) Patent No.: US 11,686,110 B2
(45) Date of Patent: Jun. 27, 2023

(54) ANCHORING SYSTEM FOR FORMWORK STRUTS

(71) Applicant: Sistemas Técnicos de Encofrados, S.A, Parets del Vallès (ES)

(72) Inventor: José Luis Ubiñana Félix, Parets del Vallès (ES)

(73) Assignee: Sistemas Técnicos de Encofrados, S.A, Parets del Vallès (ES)

( * ) Notice: Subject to any disclaimer, the term of this patent is extended or adjusted under 35 U.S.C. 154(b) by 0 days.

(21) Appl. No.: 16/985,249

(22) Filed: Aug. 5, 2020

(65) Prior Publication Data
US 2021/0040752 A1 Feb. 11, 2021

(30) Foreign Application Priority Data
Aug. 5, 2019 (EP) .................................... 19382683

(51) Int. Cl.
*E04G 11/48* (2006.01)
*E04G 5/16* (2006.01)
(Continued)

(52) U.S. Cl.
CPC ............... *E04G 11/48* (2013.01); *E04G 5/16* (2013.01); *E04G 7/305* (2013.01); *E04G 17/047* (2013.01); *E04G 2017/0646* (2013.01)

(58) Field of Classification Search
CPC ......... E04G 11/48; E04G 11/483; E04G 5/16; E04G 7/34; E04G 7/302; E04G 7/303;
(Continued)

(56) References Cited

U.S. PATENT DOCUMENTS

| 2,999,570 A | * | 9/1961 | Seiz | ........................ A47B 57/50 403/13 |
| 3,564,803 A | * | 2/1971 | Breeze et al. | .......... E04G 11/48 52/638 |

(Continued)

FOREIGN PATENT DOCUMENTS

| AU | 426086 | 7/1972 | |
| CA | 3031706 A1 | * 2/2018 | ............. E04G 5/147 |

(Continued)

OTHER PUBLICATIONS

European Search Report and the European Search Opinion dated Jan. 31, 2020 From the European Patent Office Re. Application No. 19382683.1. (8 Pages).

*Primary Examiner* — Michael Safavi

(57) ABSTRACT

Anchoring system for formwork struts comprising a male element with a seat for joining the head of a strut and at least one pin, the seat and the pin being configured so that when in use, the pin is perpendicular to the plane containing the two struts to be anchored together, the pin having a protuberance at the end, as well as a female element comprising a bar with a flat surface, said flat surface comprising a slot perpendicular to the longitudinal dimension of the bar, with a width smaller than that of the protuberance and at least one portion with a width larger than that of the pin, comprising an opening for the introduction of the pin in the slot in a position, such that when in use, the opening is located in a position lower than the slot and the pin is fastened in an upper area of the slot.

4 Claims, 2 Drawing Sheets

(51) Int. Cl.
  *E04G 17/04* (2006.01)
  *E04G 7/30* (2006.01)
  E04G 17/06 (2006.01)
(58) Field of Classification Search
  CPC ........... E04G 7/305; E04G 7/30; E04G 11/38;
      E04G 17/047; E04G 2017/0646; F16B
      12/34; F16B 12/22; F16B 12/40
  See application file for complete search history.

(56) References Cited

U.S. PATENT DOCUMENTS

| | | | | | |
|---|---|---|---|---|---|
| 4,026,079 | A | * | 5/1977 | Morris | E04G 1/14 52/126.7 |
| 4,145,098 | A | * | 3/1979 | Alexander | F16B 12/34 312/195 |
| 4,212,445 | A | * | 7/1980 | Hagen | F16B 12/34 248/222.52 |
| 4,470,574 | A | * | 9/1984 | Jackson | E04G 11/48 249/205 |
| 4,481,748 | A | * | 11/1984 | D'Alessio | E04G 11/48 182/178.5 |
| 4,841,708 | A | * | 6/1989 | Johnston | E04G 1/12 249/18 |
| 5,112,155 | A | * | 5/1992 | Jackson | E04G 7/305 403/49 |
| 5,560,502 | A | * | 10/1996 | Hsiung | A47B 43/04 211/195 |
| 5,590,862 | A | * | 1/1997 | Ono | E04G 7/30 248/354.1 |
| 7,017,710 | B2 | * | 3/2006 | Booysen | E04G 1/14 182/151 |
| 10,626,905 | B1 | * | 4/2020 | Chiu | A47B 57/545 |
| 2002/0179370 | A1 | * | 12/2002 | Ono | E04G 5/14 182/113 |
| 2007/0274771 | A1 | * | 11/2007 | Chang | E04G 7/32 403/187 |
| 2017/0290421 | A1 | * | 10/2017 | Wood | A47B 47/0091 |
| 2021/0054638 | A1 | * | 2/2021 | Steck | E04G 7/22 |

FOREIGN PATENT DOCUMENTS

| | | | | | |
|---|---|---|---|---|---|
| CN | 108385969 | A | * | 8/2018 | ........... E04G 11/486 |
| DE | 2021865 | A1 | * | 11/1970 | ........... A47B 57/50 |
| DE | 2146873 | A1 | * | 3/1973 | ........... A47B 57/402 |
| DE | 2237490 | A1 | * | 2/1974 | ............... E04G 1/12 |
| DE | 2412086 | A1 | * | 6/1975 | ............... F16B 12/34 |
| DE | 2634465 | A | * | 3/1977 | ............... E04G 11/48 |
| DE | 102004055394 | A1 | * | 7/2005 | ............... E04G 5/14 |
| DE | 102010000472 | A1 | * | 8/2011 | ............... E04G 5/14 |
| DE | 202012005057 | U1 | * | 7/2012 | ........... F16B 7/0473 |
| DE | 102017216255 | A1 | * | 3/2019 | ............... E04G 11/48 |
| DE | 202019101909 | U1 | * | 5/2019 | ............... E04G 5/14 |
| DE | 202020104196 | U1 | * | 8/2020 | ............ E04G 5/147 |
| FR | 1219706 | | | 5/1960 | |
| FR | 1369373 | A | * | 8/1964 | ............... F16B 12/30 |
| FR | 1407093 | A | * | 7/1965 | ............ E04G 7/305 |
| FR | 1455830 | A | * | 10/1966 | ........... A47B 57/402 |
| FR | 2379720 | | | 9/1978 | |
| FR | 3094735 | A1 | * | 10/2020 | ............ E04G 7/307 |
| GB | 901352 | A | * | 7/1962 | ............... E04G 1/00 |
| GB | 1152467 | A | * | 5/1969 | ............ E04G 7/307 |
| GB | 2546783 | A | * | 8/2017 | ............... E04G 7/34 |
| JP | 11241499 | A | * | 9/1999 | ............ E04G 11/48 |
| JP | 2002-356989 | | | 12/2002 | |
| JP | 2006257864 | A | * | 9/2006 | |

\* cited by examiner

ANCHORING SYSTEM FOR FORMWORK STRUTS

RELATED APPLICATION

This application claims the benefit of priority of European Patent Application No. 19382683.1 filed on Aug. 5, 2019, the contents of which are incorporated herein by reference in their entirety.

FIELD AND BACKGROUND OF THE INVENTION

The object of the present invention is to register an anchoring system for formwork structures, particularly convenient for structures having struts without tripods.

More specifically, the invention proposes the development of a fastening assembly between the struts and the anchoring bars which are used to strengthen the vertical nature of the struts, which due to the particular configuration thereof, enables the operator to place the bars quickly and easily.

Wedge clamps or couplers for anchoring bars placed between the struts of formwork structures of roofs are known in the current state of the art. These clamps or couplers, shown for example in patent application WO2014159512, are used to fasten the anchoring bars placed between the base of one of the struts and the upper end of the neighbouring strut, turning the bar into a diagonal supporting element which prevents the squared structure of the formwork from collapsing due to a lateral impulse.

A drawback of these clamps is that in order to place them on the upper end of the struts, the operator must get on working means at a height which enables them to reach it, with the subsequent risks and loss of time. Moreover, this type of clamp is only suitable for wood or partially deformable bars, since the fastening resistance consists of the friction made by the wedge when it warps against the bar.

Therefore, there is still a need for a strut anchoring system or assembly that is cheap to manufacture, robust when in use, quick to place and suitable for any type of bar. The present invention helps to solve the existing deficit.

SUMMARY OF THE INVENTION

The anchoring system for struts object of this invention corresponds to an assembly made up of the following components:
- a male element, comprising a seat for joining the head of a strut and at least one pin, the seat and the pin being configured so that when in use, the pin is perpendicular to the plane containing the two struts to be anchored, the pin having a protuberance at the end,
- a female element, consisting of a bar with a flat surface, said flat surface comprising a slot perpendicular to the longitudinal dimension of the bar, with a width smaller than that of the protuberance and at least one portion with a width larger than that of the pin, comprising an opening for the introduction of the pin in the slot in a position, such that when in use, the opening is located in a position lower than the slot and the pin is fastened in an upper area of the slot.

Thanks to this configuration of the anchoring system, an operator does not need to get on any working means at a height in order to reach the upper end of the strut, but rather they only need to hold the bar and move the upper end thereof causing the pin to be introduced into the slot. Once this has been achieved, the other end of the bar can be fastened to the base of the neighbouring strut by means of other known methods, such as by means of a wedge clamp if the bar has a rectangular cross section or by means of an EN74 double swivel coupler if the bar has circular profile. Due to the weight of the bar itself, the pin is fastened in the upper end of the slot, and given that the slot is perpendicular to the longitudinal dimension of the bar, it exerts the diagonal stresses which prevent the squared structure of the formwork from collapsing due to a lateral thrust. Lastly, thanks to the protuberance, the slot cannot leave the pin in a lateral direction, but the anchoring bar can only be disassembled if the operator intends to lift the slot until it opens.

In one possible embodiment, said flat surface may consist of a plate joined to the bar. In this case, the bar can have a rectangular cross section, whether it be hollow or solid, or a circular profile. If the bar has a rectangular cross section, the plate can comprise a side arranged at a 90 degree angle in order to facilitate the process of placing and fastening the plate in the bar. Likewise, the plate can comprise a longitudinal positioning stop which is longitudinal with respect to the bar, for example being able to consist of a section bent at a 90 degree angle produced by means of die cutting. If the bar has a circular profile, it may comprise a longitudinal cut-out at the end wherein the plate is inserted and fastened.

In another possible embodiment, said flat surface may consist of a section of the bar itself. In this case, the bar preferably has a hollow profile, whether it be circular or rectangular, wherein said section either consists of one end of the profile pressed into a laminar shape or one of the faces of the profile itself, whether it be the face with a rectangular profile or the one with a circular profile which has been flattened.

In relation to the slot, the width thereof may decrease moving away from the opening, meaning that the end of the slot may have a width even smaller than that of the pin. In this manner, the pin can be fastened to the slot without reaching the end of the slot, leaving a joint without lateral play. This solution prevents uncomfortable vibrations for the operators in the formwork structure.

Preferably, the female element comprises a second slot symmetrical to the first one, the opening being located between both slots. In this case, the opening may preferably consist of a centred hole between the slots, with a size larger than the protuberance, wherein the slots and the hole are overlapping and form a single closed cut-out. In this manner, the side of the bar through which the pin is intended to be inserted is irrelevant, since it can also be located in a slot situated above the opening, while providing the outline of the slot with increased robustness.

Moreover, the female element can also comprise more than one slot, which are distributed in the longitudinal direction of the female element, such that the position in which it is placed is able to be adjusted.

These and other features and advantages of the anchoring system object of the present invention will be evident in light of the description of a preferred, but not exclusive, embodiment which is illustrated by way of non-limiting example in the drawings which are attached.

BRIEF DESCRIPTION OF THE SEVERAL VIEWS OF THE DRAWINGS

FIG. 4a is a plan view of a second embodiment of the female element.

FIG. 4b is a view of the profile of FIG. 4a.

DESCRIPTION OF SPECIFIC EMBODIMENTS OF THE INVENTION

Figure 1:
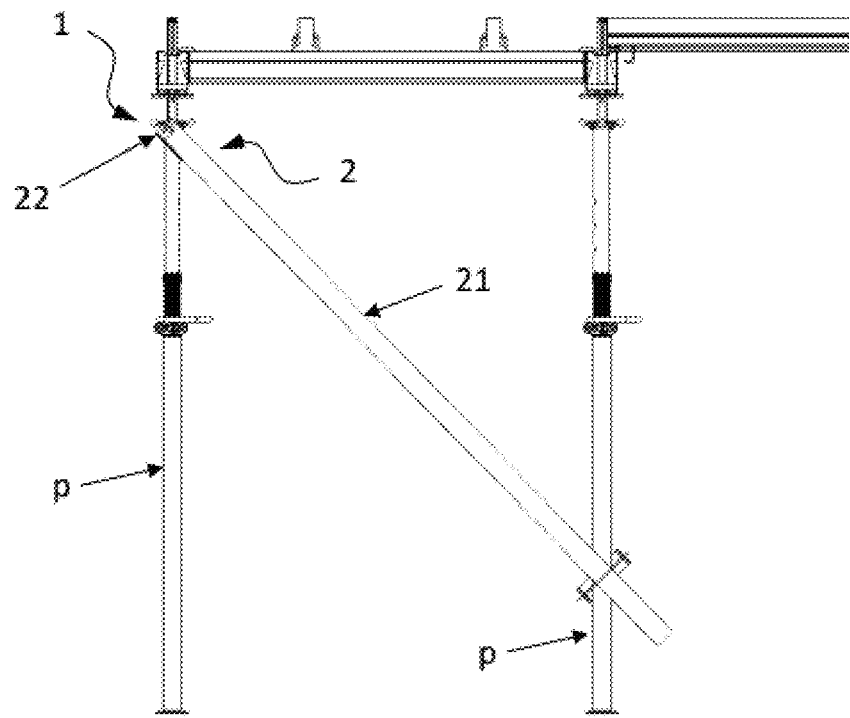
FIG. 1 is an elevation view of an example of a formwork structure including the present invention when in use.

As shown in FIG. 1, a first preferred embodiment of the present invention when in use corresponds to an assembly made up of:
- a male element (1) joined to the head of a strut (p) and
- a female element (2) comprising a bar (21) with the upper end fastened to the male element (1) by means of a plate (22), and the other end joined to the lower area of the neighbouring strut, in this example by means of a wedge clamp.

Figure 2:
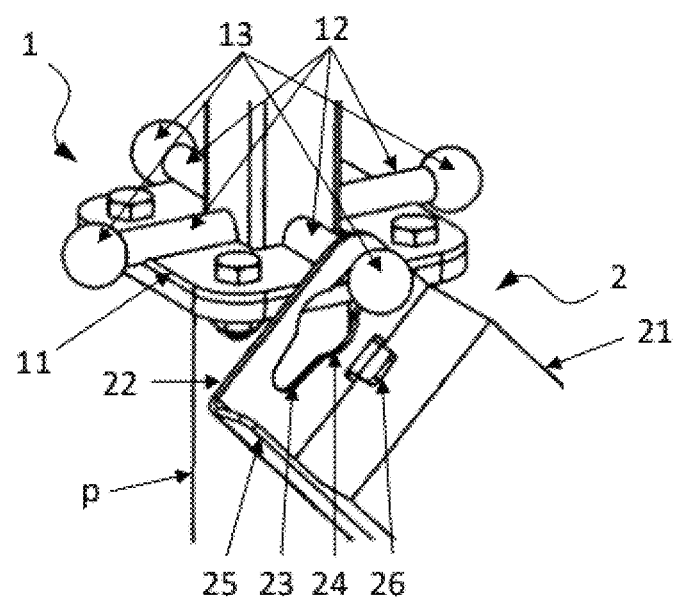
FIG. 2 is a perspective detail view of a first preferred embodiment of the invention when in use.

As seen in FIG. 2, the male element (1) comprises a seat (11) for being joined to the head of the strut (p) and four pins (12) distributed at right angles to each other and containing a protuberance (13) at the end. As for the female element (2), it comprises a bar (21), for example which is solid and has a rectangular cross section, with a plate (22) comprising a slot (23), in this case being double and symmetrical, the longitudinal dimension of which is perpendicular to the longitudinal dimension of the bar (21). The slot in turn has an opening (24), in this case in the shape of a central hole, the diameter of which is larger than that of the protuberance (13), and which is overlapping with the slot (12), forming a single closed cut-out. In turn, the width of the slot (23) decreases moving away from the opening (24), from a width larger than that of the pin (12) to a width smaller than that of the latter, such that the pin (12) is fastened in the slot (23) shortly before reaching the end thereof.

Figure 3:
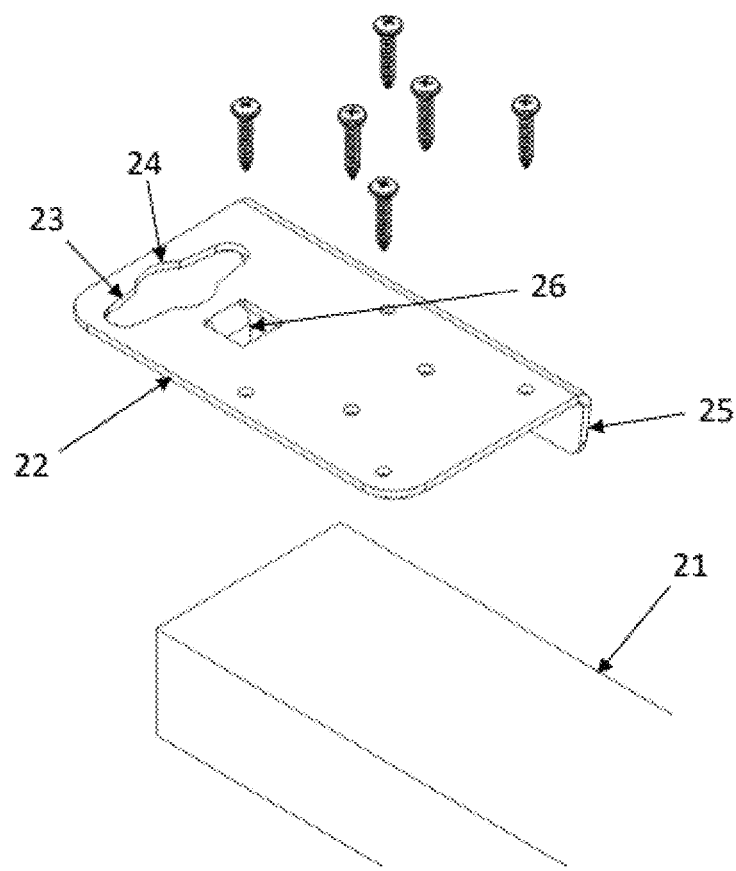
FIG. 3 is an exploded perspective view of the female element of the first preferred embodiment.

In this first preferred embodiment, as seen in FIG. 3, the plate (22) comprises a side (25) folded at a 90 degree angle, as well as a longitudinal positioning stop (26) which is longitudinal with respect to the bar (21) consisting in this case of a section die cut at a 90 degree angle. The joining means between the bar (21) and the plate (22) in this embodiment, wherein the bar (21) is made of wood, consist of 6 screws.

Figures 4A, 4B:
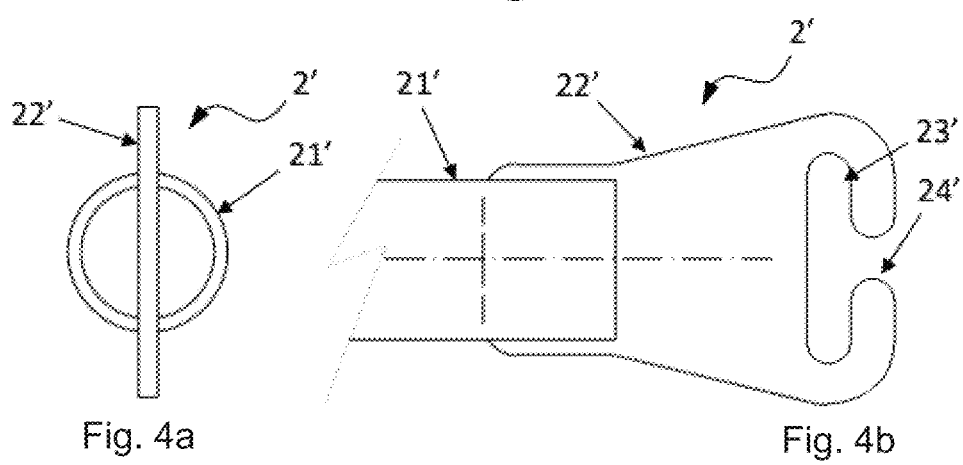

In a second preferred embodiment of the female element (2'), shown in FIG. 4a and FIG. 4b, the bar has a circular profile (21') comprising a longitudinal cut-out at the end wherein the plate (22') is inserted and fastened.

The details, shapes, dimensions and other accessory elements of the present anchoring system may be conveniently replaced by others that are technically equivalent without departing from the scope defined by the claims included below.

What is claimed is:
1. An anchoring system for formwork struts comprising:
    a plurality of struts (p),
    a male element (1) attachable above one of the plurality of struts (p),
    a female element (2, 2'), comprising a bar (21, 21') attached diagonally to two adjacent struts from the plurality of struts (p);
    wherein the male element (1), comprises a seat (11) for joining the head of a strut (p) and four pins (12) distributed at right angles to each other, the seat (11) and at least one pin (12) being configured so that when in use, the pin (12) is perpendicular to a plane containing the longitudinal axes of the two struts (p), the pin (12) having a protuberance (13) at the end;
    wherein the female element (2, 2'), is provided with a flat surface, said flat surface comprising a slot (23, 23') perpendicular to a longitudinal dimension of the bar (21, 21'), with a width smaller than that of the protuberance (13) and at least one portion with a width larger than that of the pin (12), comprising an opening (24, 24') for the introduction of the pin (12) in the slot (23, 23') in a position such that when in use the pin (12) is fastened in an upper area of the slot (23, 23');
    wherein the flat surface consists of a plate (22, 22') joined to the bar (21, 21'), the plate (22) comprises a longitudinal positioning stop (26) mounted longitudinally with respect to the bar.
2. The system according to claim 1, wherein the longitudinal positioning stop (26) consists of a section bent at a 90 degree angle produced by means of die cutting the plate (22).
3. The system according to claim 1, wherein the width of the slot (23) decreases moving away from the opening (24).
4. The system according to claim 1, wherein the plate (22) is folded comprises a side (25) arranged at a 90 degree angle to form a side wall (25).

* * * * *